United States Patent
Chen et al.

(10) Patent No.: US 12,283,885 B2
(45) Date of Patent: *Apr. 22, 2025

(54) SWITCHING CONVERTER WITH QUASI-RESONANT CONTROL AND CONTROL METHOD THEREOF

(71) Applicant: Hangzhou MPS Semiconductor Technology Ltd., Hangzhou (CN)

(72) Inventors: Xuefeng Chen, Hangzhou (CN); Hui Li, Hangzhou (CN)

(73) Assignee: Hangzhou MPS Semiconductor Technology Ltd., Zhejiang (CN)

( * ) Notice: Subject to any disclaimer, the term of this patent is extended or adjusted under 35 U.S.C. 154(b) by 219 days.

This patent is subject to a terminal disclaimer.

(21) Appl. No.: 17/956,396

(22) Filed: Sep. 29, 2022

(65) Prior Publication Data

US 2023/0188033 A1     Jun. 15, 2023

(30) Foreign Application Priority Data

Dec. 10, 2021   (CN) .......................... 202111507178.1

(51) Int. Cl.
*H02M 3/335*     (2006.01)
*H02M 1/00*      (2007.01)
*H02M 3/156*     (2006.01)

(52) U.S. Cl.
CPC ......... *H02M 3/156* (2013.01); *H02M 1/0006* (2021.05); *H02M 1/0025* (2021.05); *H02M 3/33507* (2013.01)

(58) Field of Classification Search
CPC .............................................. H02M 3/335–42
See application file for complete search history.

(56) References Cited

U.S. PATENT DOCUMENTS

| | | |
|---|---|---|
| 2022/0103078 A1 | 3/2022 | Fan et al. |
| 2022/0209665 A1 | 6/2022 | Li et al. |
| 2022/0209676 A1 | 6/2022 | Li et al. |
| 2023/0188046 A1* | 6/2023 | Chen ....................... H02M 1/08 363/89 |

* cited by examiner

*Primary Examiner* — Peter M Novak
(74) *Attorney, Agent, or Firm* — Perkins Coie LLP (57) ABSTRACT

A controller of a switching converter having a switch and an energy storage component. The controller has a hysteresis feedback circuit for generating a hysteresis feedback signal based on an output feedback signal of the switching converter, a first comparison circuit for generating a first comparison signal by comparing the hysteresis feedback signal with a ramp signal, a second comparison circuit for generating a second comparison signal by comparing the output feedback signal with the ramp signal, and a turn-on control circuit. The turn-on control circuit generates a target locked valley number based on a valley pulse signal in response to one or more valleys of a voltage drop across the switch, the first comparison signal, the second comparison signal and a current locked valley number, and further generates a turning on control signal corresponding to the target locked valley number for turning ON the switch.

20 Claims, 10 Drawing Sheets

SWITCHING CONVERTER WITH QUASI-RESONANT CONTROL AND CONTROL METHOD THEREOF

CROSS-REFERENCE TO RELATED APPLICATIONS

This application claims the benefit of CN application 202111507178.1 filed on Dec. 10, 2021, and incorporated herein by reference.

TECHNICAL FIELD

The present invention generally relates to electronic circuits, and more particularly but not exclusively to switching converters with quasi-resonant control and control methods thereof.

BACKGROUND

Flyback converters with quasi-resonant control are widely used in traditional low-power applications. The flyback converter with quasi-resonant control works under CRM (critical-current-mode), when a current flowing through an energy storage component decreases to zero, the energy storage component resonates with a parasitic capacitance of a power switch. The power switch is turned on when a voltage VDS across the power switch reaches its resonant valley (i.e., valley point of the voltage VDS during resonance), which is called valley switching, so as to reduce the switching loss.

In the flyback converter with quasi-resonant control, when load is light and an input voltage is high, the switching frequency may be too high, and even to introduce some serious electromagnetic interference. Which not only negatively influence the quality of the power grid, but also hinders the normal operation of electronic devices connected to or located near the flyback converter, and even interferes with radio waves and television signals. Therefore, the switching frequency of the converter needs to be limited.

A traditional solution to limit the switching frequency is to set a minimum time limit (e.g., a minimum switching cycle or a minimum off-time), and the power switch only can be turned on after the minimum time limit, and thus limiting the switching frequency while maintaining the benefit of valley switching. However, the switching converter with quasi-resonant control in the art could generate audio noise and/or discontinuous output power, due to the valley jumping back and forth between two adjacent valleys through loop adjustment. Besides, to handle the higher demands of power density, the flyback converters are required to provide a much higher switching frequency on recent trends. As the switching frequency increases, the switching losses of the power switch of the quasi-resonant flyback converter increase proportionally, resulting in a serious decrease in efficiency.

Accordingly, it is desired to provide a switching converter that can provide an optimized quasi-resonant control strategy, so that the performance of the switching converter is effectively improved consequently.

SUMMARY

Embodiments of the present invention are directed to controllers used in a switching converter with quasi-resonant control. The switching converter has a first switch and an energy storage component coupled to the first switch. The controller comprises a hysteresis feedback circuit, a first comparison circuit, a second comparison circuit, a valley detection circuit and a turn-on control circuit. The hysteresis feedback circuit is configured to generate a hysteresis feedback signal based on an output feedback signal indicative of an output signal of the switching converter. The first comparison circuit is configured to compare the hysteresis feedback signal with a ramp signal and generate a first comparison signal. The second comparison circuit is configured to compare the output feedback signal with the ramp signal and generate a second comparison signal. The valley detection circuit is configured to provide a valley pulse signal in response to one or more valleys of a voltage drop across the first switch during an OFF state of the first switch. The turn-on control circuit is configured to generate a target locked valley number based on the valley pulse signal, the first comparison signal, the second comparison signal and a current locked valley number, and further is configured to generate a turning on control signal corresponding to the target locked valley number, for turning ON the first switch.

BRIEF DESCRIPTION OF THE DRAWING

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

In the following descriptions, a flyback converter is used as an example to explain the working principle of the present invention. However, persons skilled in the art can recognize that it is not intended to limit the invention. The present invention may be applied to any other suitable switching converters.

Figure 1:
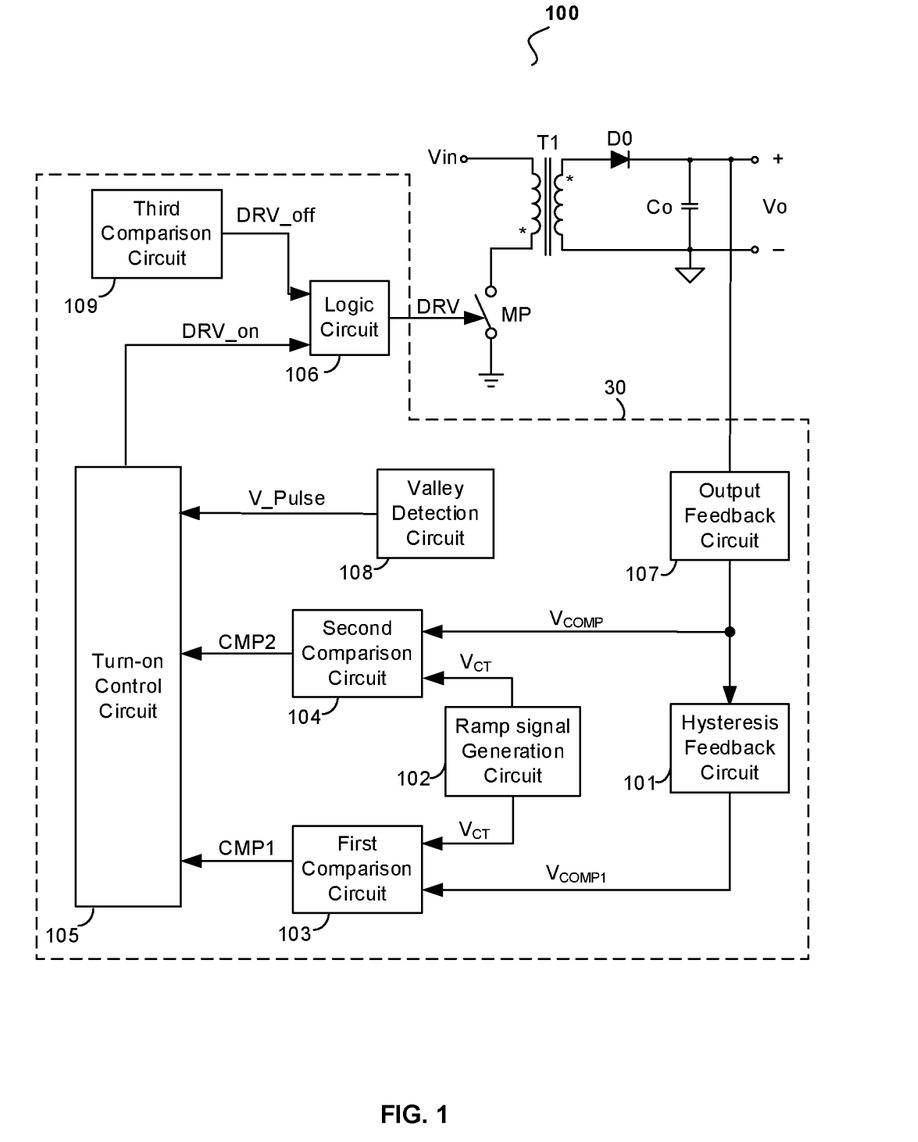
FIG. 1 illustrates a block diagram of a switching converter 100 with quasi-resonant control in accordance with an embodiment of the present invention.

FIG. 1 illustrates a block diagram of a switching converter 100 with quasi-resonant control in accordance with an embodiment of the present invention. As shown in FIG. 1, the switching converter 100 comprises a transformer T1, a main switch MP, a diode D0, an output capacitor Co and a controller 30. The transformer T1 has a primary winding and a secondary winding with each of the windings having a first terminal and a second terminal. The first terminal of the primary winding is configured to receive an input voltage Vin, the first terminal of the secondary winding is configured to provide a DC output voltage Vo through the diode D0, the second terminal of the secondary winding is coupled to a secondary ground. The main switch MP is coupled between the second terminal of the primary winding and a primary ground.

As shown in FIG. 1, the controller 30 comprises a hysteresis feedback circuit 101, a ramp signal generation circuit 102, a first comparison circuit 103, a second comparison circuit 104, a turn-on control circuit 105, a logic circuit 106, a valley detection circuit 108 and a third comparison circuit 109. The controller 30 receives an output signal (e.g. output voltage, output current or output power) of the switching converter 100 and generates a control signal DRV to control the main switch MP, to convert the input voltage Vin into the output voltage Vo.

In the embodiment shown in FIG. 1, the output feedback circuit 107 is configured to generate the output feedback signal $V_{COMP}$ indicative of the output signal of the switching converter 100. In one embodiment, the output feedback circuit 107 generates the output feedback signal $V_{COMP}$ based on an output voltage Vo of the switching converter 100. In some embodiments, the output feedback circuit 107 includes a voltage divider coupled to receive the output voltage Vo, and an error amplifying circuit which proportionally integrates the error between the signal generated by the voltage divider and a reference voltage. In other embodiments, the output feedback circuit 107 utilizes a conventional three-terminal regulator and an impedance network to obtain the output feedback signal $V_{COMP}$. In one embodiment, the output feedback circuit 107 may include an isolation device such as an optocoupler or the like.

As shown in FIG. 1, the hysteresis feedback circuit 101 has an input terminal coupled to receive the output feedback signal $V_{COMP}$, and is configured to generate a hysteresis feedback signal $V_{COMP1}$ based on the output feedback signal $V_{COMP}$. In one embodiment, the hysteresis feedback signal $V_{COMP1}$ is proportional to the output feedback signal $V_{COMP}$ and the proportional coefficient is greater than or less than one. In another embodiment, the hysteresis feedback circuit 101 generates a first hysteresis voltage VHys based on the output feedback signal $V_{COMP}$, and provides the hysteresis feedback signal $V_{COMP1}$ by adding the first hysteresis voltage VHys onto the output feedback signal $V_{COMP}$. In yet another embodiment, the hysteresis feedback circuit 101 provides the hysteresis feedback signal $V_{COMP1}$ by subtracting the first hysteresis voltage VHys from the output feedback signal $V_{COMP}$. The first hysteresis voltage VHys is independent of a resonant period during an OFF state of the main switch MP. In a further embodiment, the hysteresis feedback circuit 101 is configured to receive the input voltage Vin and/or an input line voltage of the switching converter 100, and to provide the first hysteresis voltage VHys based on the input information.

The first comparison circuit 103 has a first input terminal coupled to the ramp signal generation circuit 102 to receive a ramp signal $V_{CT}$ and a second input terminal coupled to the hysteresis feedback circuit 101 to receive the hysteresis feedback signal $V_{COMP1}$. The first comparison circuit 103 is configured to compare the hysteresis feedback signal $V_{COMP1}$ with the ramp signal $V_{CT}$ and provide a first comparison signal CMP1 at an output terminal. The second comparison circuit 104 is coupled to the ramp signal generation circuit 102 and the output feedback circuit 107, is configured to compare the output feedback signal $V_{COMP}$ with the ramp signal $V_{CT}$ and provide a second comparison signal CMP2 at an output terminal.

The valley detection circuit 108 is configured to detect one or more valleys of a voltage drop VDSP across the main switch MP during the OFF state of the main switch MP and generate a valley pulse signal V_Pulse at an output terminal. In one embodiment, the valley detection circuit 108 is configured to detect whether the voltage drop VDSP is below a valley threshold voltage during the OFF state of the main switch MP, and provide the valley pulse signal V_Pulse based on the detection. In another embodiment, during the OFF state of the main switch MP, the valley detection circuit 108 is coupled to an auxiliary winding of the transformer T1 to receive a reflected voltage and is configured to detect whether the reflected voltage is less than a reflected threshold voltage, and provide the valley pulse signal V_Pulse at the output terminal.

The turn-on control circuit 105 has a first input terminal, a second input terminal, a third input terminal and an output terminal. Wherein the first input terminal is coupled to the first comparison circuit 103 to receive the first comparison signal CMP1, the second input terminal is coupled to the second comparison circuit 104 to receive the second comparison signal CMP2, the third input terminal is coupled to the valley detection circuit 108 to receive the valley pulse signal V_Pulse. Based on the first comparison signal CMP1, the second comparison signal CMP2, the valley pulse signal V_Pulse and a current locked valley number V_LOCK (n−1), the turn-on control circuit 105 determines a target locked valley number V_LOCK(n) for next turning-on, and provides a turning-on control signal DRV_on corresponding to the target locked valley number V_LOCK(n), to turn ON the main switch MP.

In one embodiment, the turn-on control circuit 105 is configured to compare a first designated valley number with the current locked valley number V_LOCK(n−1), and to determine whether to increase the target locked valley number V_LOCK(n) based on the comparison result. Wherein the first designated valley number is the valley number when the ramp signal $V_{CT}$ increase to reach the hysteresis feedback signal $V_{COMP1}$. In a further embodiment, the turn-on control circuit 105 is configured to compare a difference between a second designated valley number and the current locked valley number V_LOCK(n−1) with a predetermined value m, and to determine whether to decrease the target locked valley number V_LOCK(n) based on the comparison result. Wherein the second designated valley number is the valley number when the ramp signal $V_{CT}$ increase to reach the output feedback signal $V_{COMP}$, and the predetermined value m is an integer number greater than 1.

The third comparison circuit 109 is configured to compare a current sensing signal indicative of a current flowing through the main switch MP and a first threshold voltage, and generate a turning OFF control signal DRV_off at an output terminal, for turning off the main switch MP.

The logic circuit 106 is coupled to the turn-on control circuit 105 to receive the tuning on control signal DRV_on and is coupled to the third comparison circuit 109 to receive the turning off control signal DRV_off. Based on the turning on control signal DRV_on and the turning off control signal DRV_off, the logic circuit 106 provides a control signal DRV for controlling the main switch MP.

Figure 2:
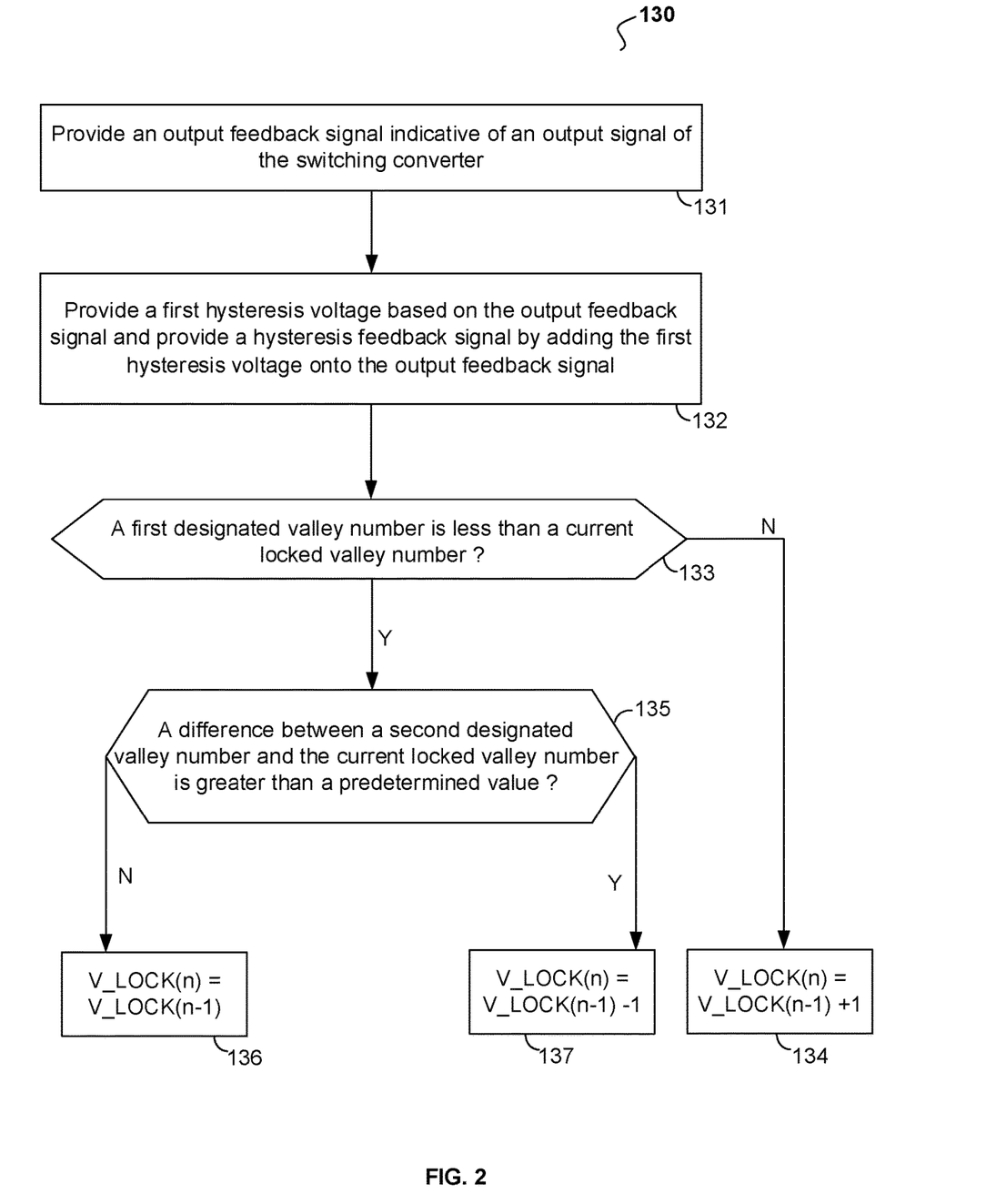
FIG. 2 illustrates a workflow for a method 130 of generating a target locked valley number in accordance with an embodiment of the present invention.

FIG. 2 illustrates a workflow for a method 130 of generating a target locked valley number in accordance with an embodiment of the present invention. As shown in FIG. 2, the method 130 of generating the target locked valley number comprises steps 131~137.

At step 131, an output feedback signal is provided by sensing an output signal (e.g. output voltage, output current or output power) of the switching converter.

At step 132, a first hysteresis voltage is generated based on the output feedback signal, and then a hysteresis feedback signal is generated based on the output feedback signal and the first hysteresis voltage. In one embodiment, the hysteresis feedback signal is generated by adding the first hysteresis voltage onto the output feedback signal. In another embodiment, the hysteresis feedback signal is generated by subtracting the first hysteresis voltage from the output feedback signal. In a further embodiment, the first hysteresis voltage is further dependent on an input line voltage, and varies with the input line voltage of the switching converter. In one embodiment, the first hysteresis voltage has different values when the input line voltages are different.

At step 133, determining whether a first designated valley number is less than the current locked valley number. Wherein the first designated valley number is designed to be the valley number when the ramp signal increases to reach the hysteresis feedback signal. If the determination is no, go step 134. Otherwise, go step 135. At step 134, the target locked valley number is increased. In one embodiment, the target locked valley number is equal to the current locked valley number plus 1.

At step 135, determining whether a difference between a second designated valley number and the current locked valley number is greater than a predetermined value m. Wherein the second designated valley number is the valley number when the ramp signal increases to reach the output feedback signal. If the determination is yes, go step 137. Otherwise, go step 136.

At step 136, the target locked valley number is kept unchanged and is equal to the current locked valley number. At step 137, the target locked valley number is decreased. In one embodiment, the target locked valley number is equal to the current locked valley number minus 1.

With the method 130, the first hysteresis voltage can be used and introduced into the generation of the target locked valley number, i.e., the first hysteresis voltage participates the valley lock of the quasi-resonant control. Due to the first hysteresis voltage is dependent on the input/output signal of the switching converter, the hysteresis for valley lock can be dynamically adjusted based on the input/output of the switching converter, and thus improving the performance. Compared with the prior valley lock control that only can be adjusted by one or more resonant periods, the present invention is more flexible and has a wider adjustment range.

Figure 3:
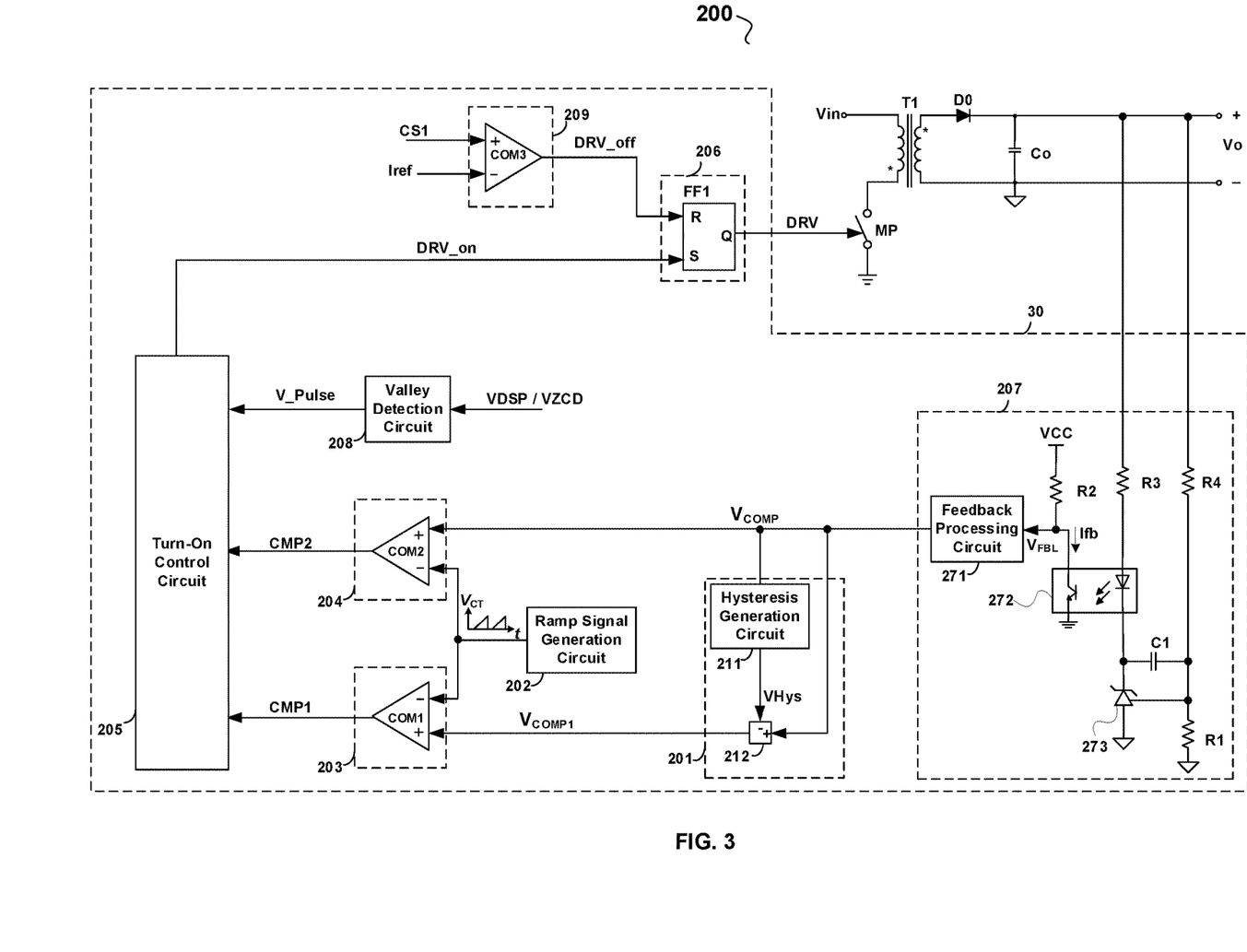
FIG. 3 illustrates a switching converter 200 with quasi-resonant control in accordance with an embodiment of the present invention.

FIG. 3 illustrates a switching converter 200 with quasi-resonant control in accordance with an embodiment of the present invention. As shown in FIG. 3, the switching converter 200 comprises a transformer T1, a switch MP coupled to a primary winding of the transformer T1, a diode D0, an output capacitor Co and a controller 30. In the embodiment shown in FIG. 3, the controller 30 comprises a hysteresis feedback circuit 201, a ramp signal generation circuit 202, a first comparison circuit 203, a second comparison circuit 204, a turn-on control circuit 205, a logic circuit 206, an output feedback circuit 207, a valley detection circuit 208 and a third comparison circuit 209.

As shown in FIG. 3, the output feedback circuit 207 comprise a feedback processing circuit 271, a photo coupler 272, a three-terminal regulator 273, resistors R1~R4, and a capacitor C1. A current Ifb flowing through the photosensitive element in the photo coupler 272 is generated based on an output voltage Vo of the switching converter 200, and then is converted into a feedback voltage signal $V_{FBL}$ through the resistor R2. In one embodiment, the feedback voltage signal $V_{FBL}$=VCC-Ifb*R2, wherein VCC is a power supply voltage. The feedback processing circuit 271 is coupled to receive the feedback voltage signal $V_{FBL}$, monitors and processes the feedback voltage signal $V_{FBL}$, and generates an output feedback signal $V_{COMP}$ corresponding to different working modes of the switching converter 200. In one embodiment, the output feedback signal $V_{COMP}$=A*$V_{FBL}$+B. Wherein A is a proportional coefficient and B is an offset value. In one embodiment, if the proportional coefficient A is 1, the offset value B is 0, and the output feedback signal $V_{COMP}$=$V_{FBL}$.

In the embodiment shown in FIG. 3, the hysteresis feedback circuit 201 comprises a hysteresis generation circuit 211 and a subtracting circuit 212. The hysteresis generation circuit 211 receives the output feedback signal $V_{COMP}$, and generates a first hysteresis voltage VHys based on the output feedback signal $V_{COMP}$. The subtracting circuit 212 subtracts the first hysteresis voltage VHys from the output feedback signal $V_{COMP}$, and provides a hysteresis feedback signal $V_{COMP1}$ at an output terminal. In another embodiment, the hysteresis generation circuit 211 further receives an input line voltage of the switching converter 200 and provides the first hysteresis voltage VHys based on the output feedback signal $V_{COMP}$ and the input line voltage.

In the embodiment shown in FIG. 3, the ramp signal generation circuit 202 is configured to provide a ramp signal $V_{CT}$ at an output terminal. In one embodiment, the ramp signal $V_{CT}$ ramps up at a first slope during the OFF state of the main switch MP. In other embodiments, the ramp signal $V_{CT}$ ramps up with a non-linear slope or a piecewise linear slope.

The first comparison circuit 203 comprises a comparator COM1. The non-inverting input terminal of the comparator COM1 is coupled to the hysteresis feedback circuit 201 to receive the hysteresis feedback signal $V_{COMP1}$, i.e., the difference between the output feedback signal $V_{COMP}$ and the first hysteresis voltage VHys. The inverting input terminal of the comparator COM1 is coupled to the ramp signal generation circuit 202 to receive the ramp signal $V_{CT}$, the output terminal is coupled to the turn-on control circuit 205 for providing a first comparison signal CMP1. In one embodiment, the first comparison signal CMP1 is reset to be high level when the main switch MP is turned OFF. When the ramp signal $V_{CT}$ increases to reach the hysteresis feedback signal $V_{COMP1}$, the first comparison signal CMP1 becomes low level from high level.

The second comparison circuit 204 comprises a comparator COM2. The non-inverting input terminal of the comparator COM2 is coupled to the output feedback circuit 207 to receive the output feedback signal $V_{COMP}$. The inverting input terminal of the comparator COM2 is coupled to the ramp signal generation circuit 202 to receive the ramp signal $V_{CT}$, the output terminal is coupled to the turn-on control circuit 205 for providing a second comparison signal CMP2. In one embodiment, the second comparison signal CMP2 is reset to be high level when the main switch MP is turned OFF. When the ramp signal $V_{CT}$ increases to reach the output feedback signal $V_{COMP}$, the second comparison signal CMP2 becomes low level from high level.

In some embodiments, to counteract the effect caused by saturation voltage of the photosensitive element, a bias voltage $V_{OFFSET}$ (e.g., 200 mV) is further added to the non-inverting input terminal of the comparator COM1 and the non-inverting input terminal of the comparator COM2.

Figure 4:
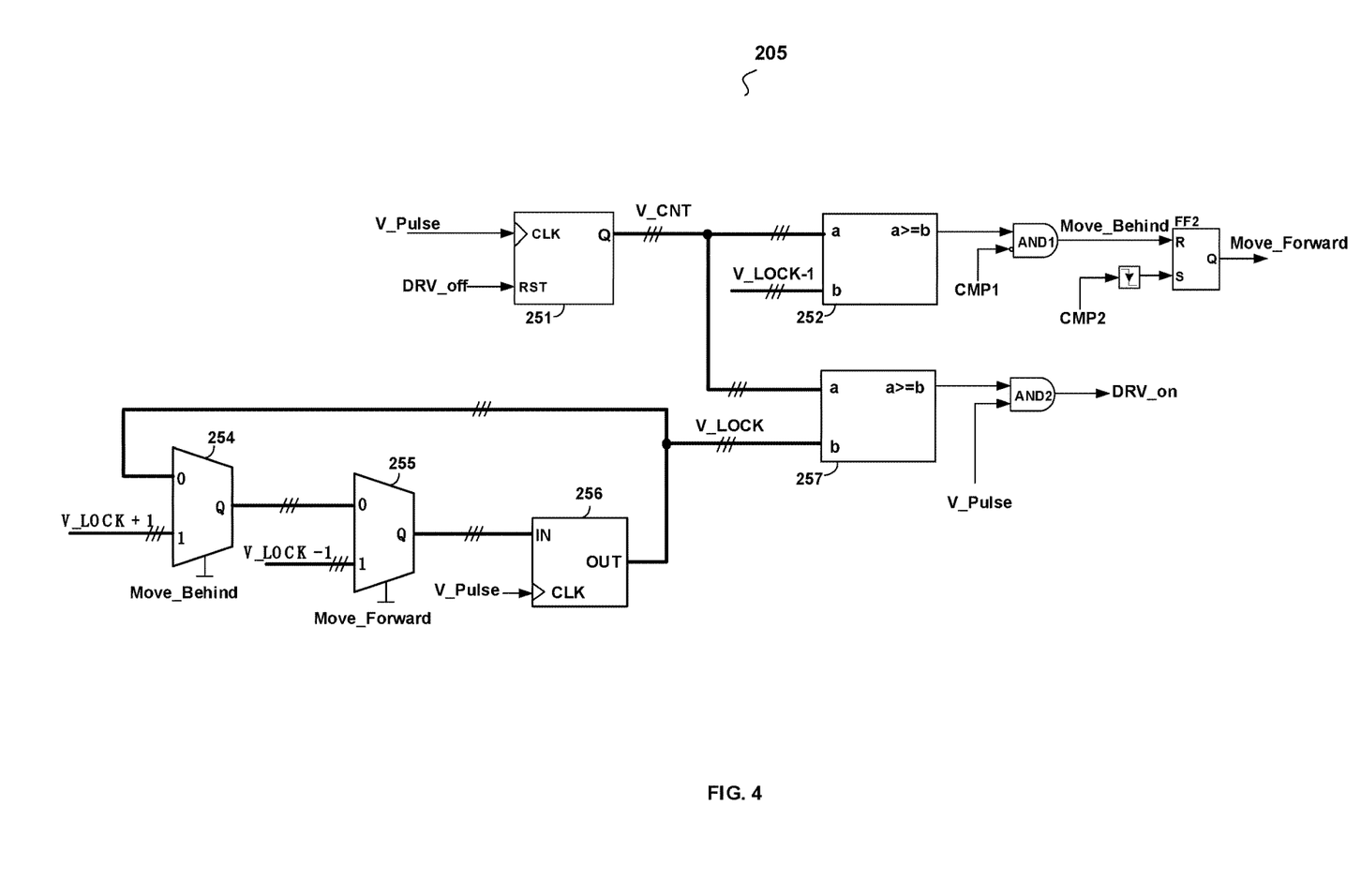
FIG. 4 illustrates a turn-on control circuit 205 shown in FIG. 3 in accordance with an embodiment of the present invention.

Several of the details of the embodiments of the turn-on control circuit described below with reference to FIG. 4 and FIG. 5. FIG. 4 illustrates a turn-on control circuit 205 shown in FIG. 3 in accordance with an embodiment of the present invention. As shown in FIG. 4, the turn-on control circuit 205 comprises a counter 251, a first digital comparator 252, a first AND gate AND1, a RS flip-flop FF2, a first multiplexer 254, a second multiplexer 255, a register 256, a second digital comparator 257 and a second AND gate AND2. The counter 251 starts counting a number of pulses of the valley pulse signal V_Pulse when the main switch MP is turned OFF, and outputs a count value V_CNT. The first digital comparator 252 and the first AND gate AND1 are configured to detect a first designated valley number when the first comparison signal CMP1 becomes low level from high level, and determine whether the first designated valley number is less than a current locked valley number V_LOCK(n−1) for providing a first indicium signal Move_Behind. The RS flip-flop FF2 has a reset terminal to receive the first indicium signal Move_Behind, a set terminal to receive the second comparison signal CMP2 through a falling-edge trigger, and an output terminal configured to provide a second indicium signal Move_Forward.

The first multiplexer 254 is configured to select the current locked valley number V_LOCK(n−1) or V_LOCK(n−1)+1 as a first output value provided at an output terminal, according to the first indicium signal Move_Behind. The second multiplexer 255 is configured to select the first output value provided by the first multiplexer 254 or V_LOCK(n−1)−1 as a second output value provided at an output terminal. The register 256 is configured to update and output the target locked valley number V_LOCK(n) when the valley pulse signal V_Pulse arrives.

In other words, the first designated valley number is the valley number when the ramp signal $V_{CT}$ increases to reach the hysteresis feedback signal $V_{COMP1}$, if the first designated valley number is greater than or equal to the current locked valley number V_LOCK(n−1), the target locked valley number V_LOCK(n) will increase by 1. Otherwise, the target locked valley number V_LOCK(n) will be kept to equal to the current locked valley number V_LOCK (n−1). Furthermore, if the difference between the second designated valley number and the current locked valley number V_LOCK(n−1) is greater than the predetermined value m (e.g., m=1), the target locked valley number V_LOCK(n) will decrease by 1.

The second digital comparator 257 is configured to compare the count value V_CNT with the target locked valley number V_LOCK(n), and the second AND gate AND2 outputs a turning on control signal DRV_on at an output terminal when the count value V_CNT is counted to reach the target locked valley number V_LOCK(n).

Referring now to FIG. 3, the third comparison circuit 209 comprises a comparator COM3. The non-inverting input terminal of the comparator COM3 is configured to receive a current sensing signal CS1 indicative of a current flowing through the main switch MP, the inverting input terminal is coupled to a threshold generator to receive a first threshold voltage Iref, the output terminal is configured to provide a turning off control signal DRV_off.

The logic circuit 206 comprises a flip-flop FF1. The flip-flop FF1 has a set terminal, a reset terminal and an output terminal, wherein the set terminal is coupled to the output terminal of the turn-on control circuit 205 to receive the turning on control signal DRV_on. The reset terminal is coupled to the third comparison circuit 209 to receive the turning off control signal DRV_off. The output terminal is coupled to a control terminal of the main switch MP for providing a control signal DRV.

Figure 5:
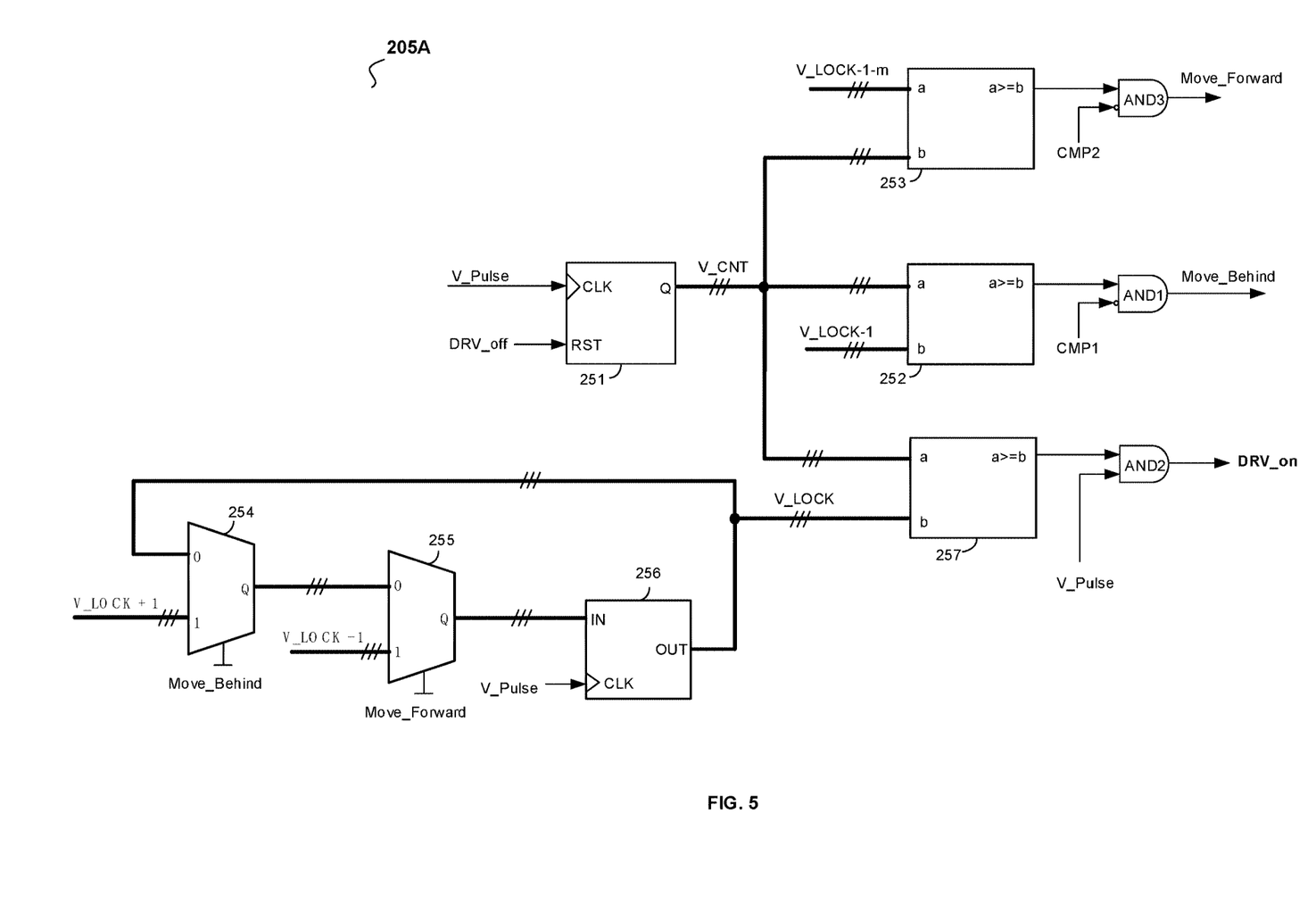
FIG. 5 illustrates a turn-on control circuit 205A shown in FIG. 3 in accordance with another embodiment of the present invention.

Referring now to FIG. 5. FIG. 5 illustrates a turn-on control circuit 205A shown in FIG. 3 in accordance with another embodiment of the present invention. Compared with the turn-on control circuit 205 shown in FIG. 4, the difference is that the generation circuits of the second indicium signal Move_Forward are different.

In the embodiment shown in FIG. 5, a third digital comparator 253 and a third AND gate AND3 are configured to determine whether a difference between the current locked valley number V_LOCK(n−1) and the predetermined value m is greater than or equal to the second designated valley number, and then provide the second indicium signal Move_Forward based on the determination. Wherein the second designated valley number is the valley number when the falling-edge of the second comparison signal CMP2 arrives.

According to the method 130 illustrated in FIG. 2, if the first designated valley number is greater than the current locked valley number V_LOCK(n−1), the target locked valley number V_LOCK(n) increases. Otherwise, the target locked valley number V_LOCK(n) will keep the current locked valley number V_LOCK(n−1) or will decrease. Wherein the first designated valley number is the valley number when the ramp signal $V_{CT}$ increases to reach the hysteresis feedback signal $V_{COMP1}$. Furthermore, if the difference between the current locked valley number V_LOCK(n−1) and the predetermined value m is higher than the second designated valley number, the target locked valley number V_LOCK(n) decreases. Otherwise, the target locked valley number V_LOCK(n) will remain the current locked valley number V_LOCK(n−1). Wherein the second designated valley number is the valley number when the ramp signal $V_{CT}$ increases to reach the output feedback signal $V_{COMP}$.

Figure 6:
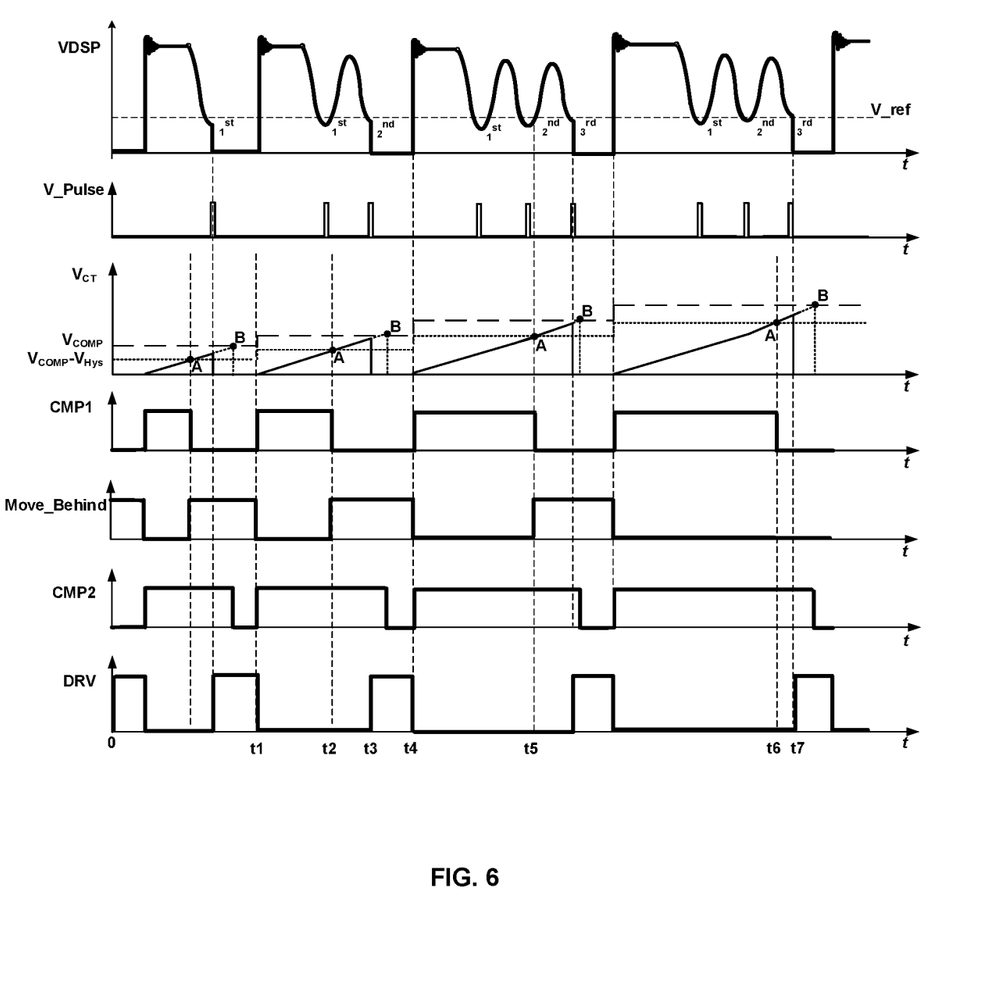
FIG. 6 illustrates working waveforms of the switching converter 200 in accordance with an embodiment of the present invention.

FIG. 6 illustrates working waveforms of the switching converter 200 in accordance with an embodiment of the present invention. As shown in FIG. 6, during the OFF state of the main switch MP, when the voltage drop VDSP across the main switch MP decreases to below a valley threshold voltage V_ref, the valley detection circuit 205 is configured to provide the valley pulse signal V_Pulse as shown.

In the switching cycle before time t1, the main switch MP is turned ON at a first valley, and thus the current clocked valley number is 1. At time t1, the main switch MP is turned OFF, both the first comparison signal CMP1 and the second comparison signal CMP2 are reset to be high level. The turn-on control circuit 205 starts counting the number of the pulses of the valley pulse signal V_Pulse, and the ramp signal $V_{CT}$ starts ramping up from time t1.

At time t2, the ramp signal $V_{CT}$ increases to reach the hysteresis feedback signal $V_{COMP1}$ (i.e., $V_{COMP}$-VHys). As shown at point A, the first comparison signal CMP1 becomes low level from high level, and the count value V_CNT at that time is 1, which is equal to the current locked valley number, and thus the first indicium signal Move_Behind becomes high, and the target locked valley number increases to 2.

At time t3, the main switch MP is turned ON at the target locked valley number, i.e. at the second valley, and the current locked valley number is updated to 2. Since the time when the second comparison signal CMP2 becomes low level is after the turning-on of the main switch MP, the target locked valley number remains unchanged. Subsequently, at time t4, the first comparison signal CMP1 is reset to be high level again. At time t5, when the ramp signal $V_{CT}$ increases to reach the hysteresis feedback signal $V_{COMP1}$, and the count value V_CNT at point A is 2, which is equal to the current locked valley number, and thus the target locked valley number needs to increase to 3. After that, at time t6, the count value V_CNT at point A is 2, which is less than the current locked valley number, and the target locked valley number remains 3. Then the main switch MP is turned ON at time t7, i.e., at the third valley.

Figure 7:
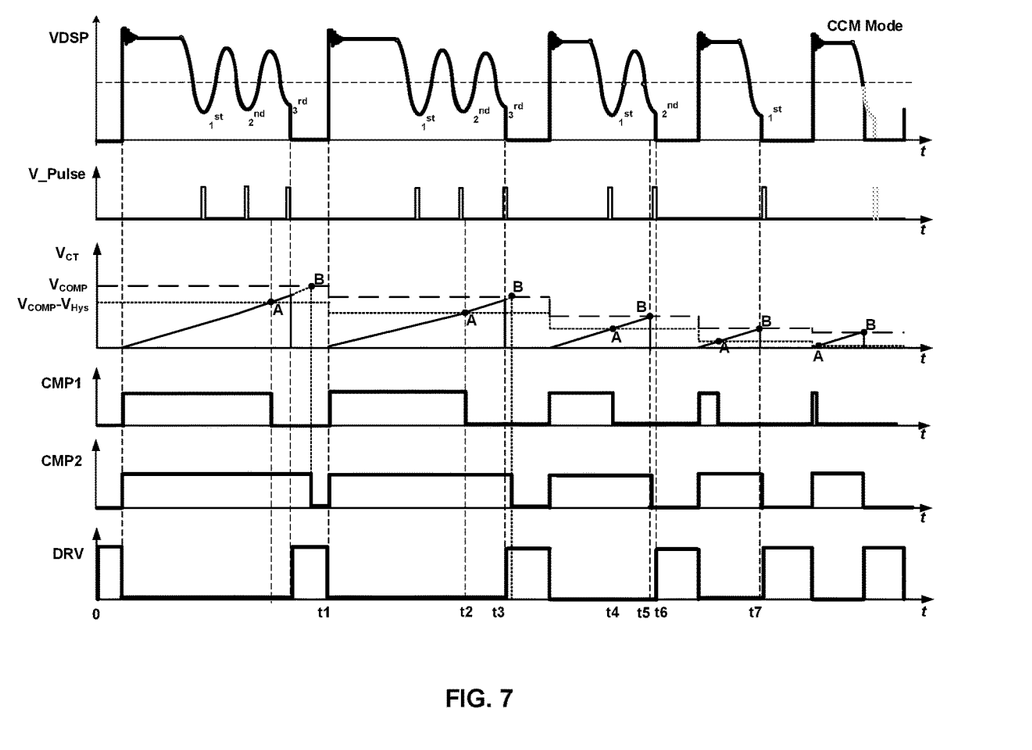
FIG. 7 illustrates working waveforms of the switching converter 200 in accordance with another embodiment of the present invention.

FIG. 7 illustrates working waveforms of the switching converter 200 in accordance with another embodiment of the present invention. As shown in FIG. 7, in the switching cycle before time t1, the main switch MP is turned ON at the third valley, and thus the current locked valley number is 3. At time t1, the main switch MP is turned OFF, the first comparison signal CMP1 is reset to be high level, the turn-on control circuit 205 starts counting the number of the pulses of the valley pulse signal V_Pulse, and the ramp signal $V_{CT}$ starts ramping up from time t1. At time t2, the ramp signal $V_{CT}$ increases to reach the hysteresis feedback signal $V_{COMP1}$ (i.e., $V_{COMP}$-VHys). As shown at point A, the first comparison signal CMP1 becomes low level from high level, and the count value V_CNT is 2, which is less than the current locked valley number, and thus the target locked valley number keeps 3 unchanged. At the same time, the second indicium signal Move_Forward keeps low level. Accordingly, the target locked valley number keeps 3 unchanged.

At time t3, the main switch MP is turned ON at the third valley, and the current locked valley number is still 3. At time t4, the ramp signal $V_{CT}$ increases to reach the hysteresis feedback signal $V_{COMP1}$ again, and the count value V_CNT at point A is 1, which is less than the current locked valley number, and thus the target locked valley number will not increase. At time t5, the count value V_CNT at point B is less than the current locked valley number, and the target locked valley number decreases. At time t6, the current locked valley number is updated to be 2. After that, at time t7, the count value V_CNT at point B is less than the current locked valley number, and the target locked valley number decreases to 1.

Figure 8:
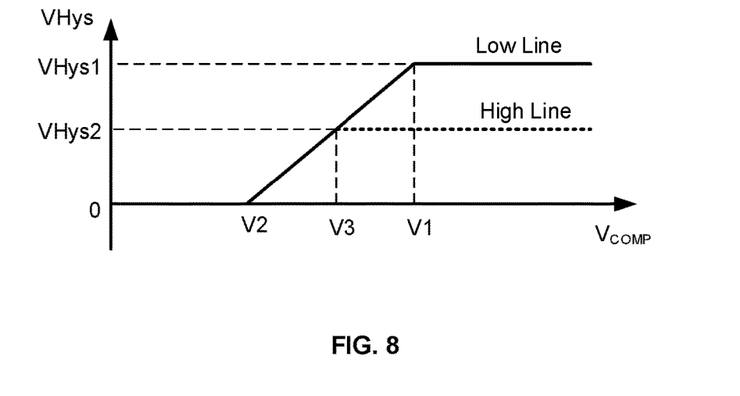
FIG. 8 illustrates a relationship curve of a first hysteresis voltage and an output feedback signal in accordance with an embodiment of the present invention.

FIG. 8 illustrates a relationship curve of a first hysteresis voltage and an output feedback signal in accordance with an embodiment of the present invention. As shown in FIG. 8, the first hysteresis voltage VHys and the output feedback signal $V_{COMP}$ have the following relationships. In one embodiment, the first hysteresis voltage VHys has a first maximum value Vhys1 when the output feedback signal $V_{COMP}$ is greater than a first feedback voltage V1 and the input line voltage is low. In another embodiment, the first hysteresis voltage VHys has a second maximum value Vhys2 when the output feedback signal $V_{COMP}$ is greater than a third feedback voltage V3 and the input line voltage is high. The first hysteresis voltage VHys decreases as the output feedback signal $V_{COMP}$ decreases when the output feedback signal $V_{COMP}$ is between the first feedback voltage V1 and a second feedback voltage V2. And the first hysteresis voltage VHys has a minimum value (e.g., 0) when the output feedback signal $V_{COMP}$ is less than the second feedback voltage V2.

In the embodiments of the present invention, the first hysteresis voltage VHys is introduced and used for participating the generation of the target locked valley number. Because the first hysteresis voltage VHys in this invention is independent from the resonant periods of VDSP ringing during the OFF state of the main switch MP, but it is related to the output signal and/or the input line voltage of the switching converter, and thus the first hysteresis voltage VHys can be adjusted based on the output and/or the input. The valley lock strategy of the present invention has a flexible hysteresis, which is no longer limited to be the prior one or more the resonant periods. Accordingly, owing to this invention can provide more flexible hysteresis for valley lock of the quasi-resonant control, the performance of the switching converter with such quasi-resonant control can be effectively improved.

Figure 9:
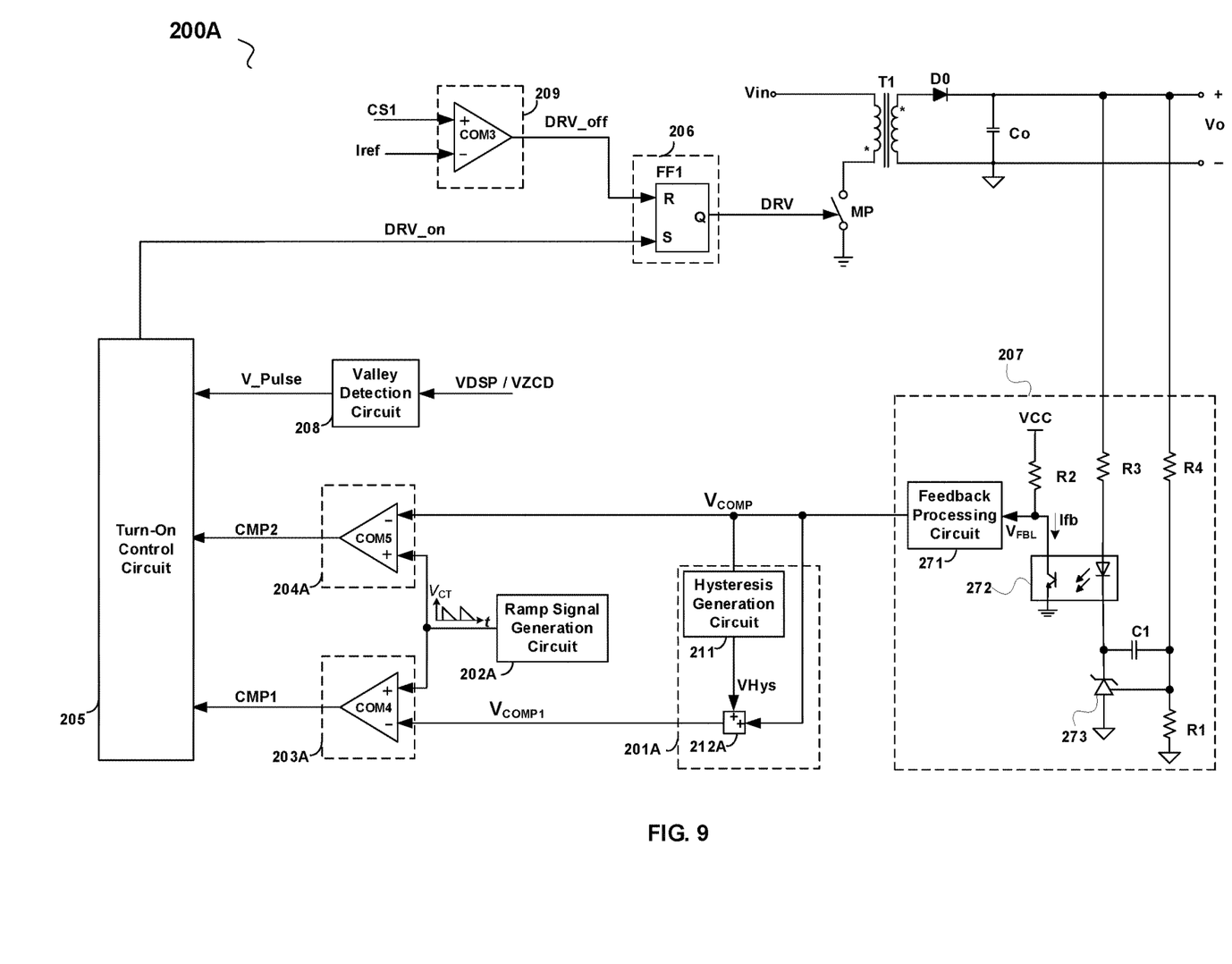
FIG. 9 illustrates a switching converter 200A with quasi-resonant control in accordance with another embodiment of the present invention.

FIG. 9 illustrates a switching converter 200A with quasi-resonant control in accordance with another embodiment of the present invention. Compared with the switching converter 200 shown in FIG. 3, the difference is that the switching converter 200A has a different hysteresis feedback circuit 201A, a ramp signal generation circuit 202A, a first comparison circuit 203A and a second comparison circuit 204A. The hysteresis feedback circuit 201A comprises a hysteresis generation circuit 211 and an adder 212A. The hysteresis feedback circuit 201A provides the hysteresis feedback signal $V_{COMP1}$ by adding the first hysteresis voltage VHys onto the output feedback signal $V_{COMP}$. The ramp signal generation circuit 202A provides a ramp signal $V_{CT}$ which decreases with a second slope during the OFF state of the main switch MP.

The first comparison circuit 203A comprise a comparator COM4. The inverting input terminal of the comparator COM4 is coupled to the hysteresis feedback circuit 201 to receive the hysteresis feedback signal $V_{COMP1}$, i.e., the sum of the output feedback signal $V_{COMP}$ and the first hysteresis voltage VHys. The non-inverting input terminal of the comparator COM4 is coupled to the ramp signal generation circuit 202A to receive the ramp signal $V_{CT}$, the output terminal is coupled to the turn-on control circuit 205 for providing the first comparison signal CMP1. In one embodiment, when the ramp signal $V_{CT}$ decreases to reach the hysteresis feedback signal $V_{COMP1}$, the first comparison signal CMP1 becomes low level from high level.

The second comparison circuit 204A comprise a comparator COM5. The inverting input terminal of the comparator COM5 is coupled to the output feedback circuit 207 to receive the output feedback signal $V_{COMP}$. The non-inverting input terminal of the comparator COM5 is coupled to the ramp signal generation circuit 202A to receive the ramp signal $V_{CT}$, the output terminal is coupled to the turn-on control circuit 205 for providing the second comparison signal CMP2. In one embodiment, when the ramp signal $V_{CT}$ decreases to reach the output feedback signal $V_{COMP}$, the second comparison signal CMP2 becomes low level from high level.

Figure 10:
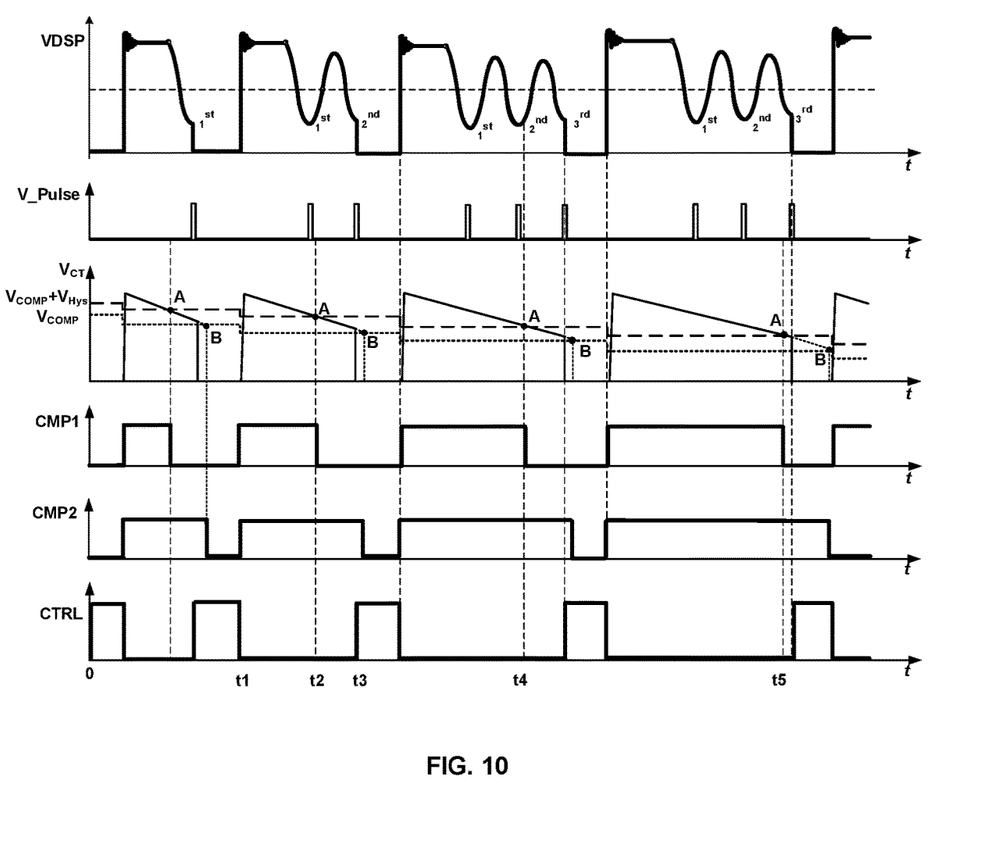
FIG. 10 illustrates working waveforms of the switching converter 200A in accordance with an embodiment of the present invention.

FIG. 10 illustrates working waveforms of the switching converter 200A in accordance with an embodiment of the present invention. As shown in FIG. 10, at time t1, the current locked valley number is 1. At time t2, the count value V_CNT at point A is 1, and thus the target locked valley number increase to 2.

At time t3, the main switch is turned ON at the second valley. At time t4, the count value V_CNT at point A is 2, the target locked valley number continue to increase to 3. At time t5, the count value V_CNT at point A is 2, which is less than the current locked valley number, the target locked valley number remains unchanged.

Figure 11:
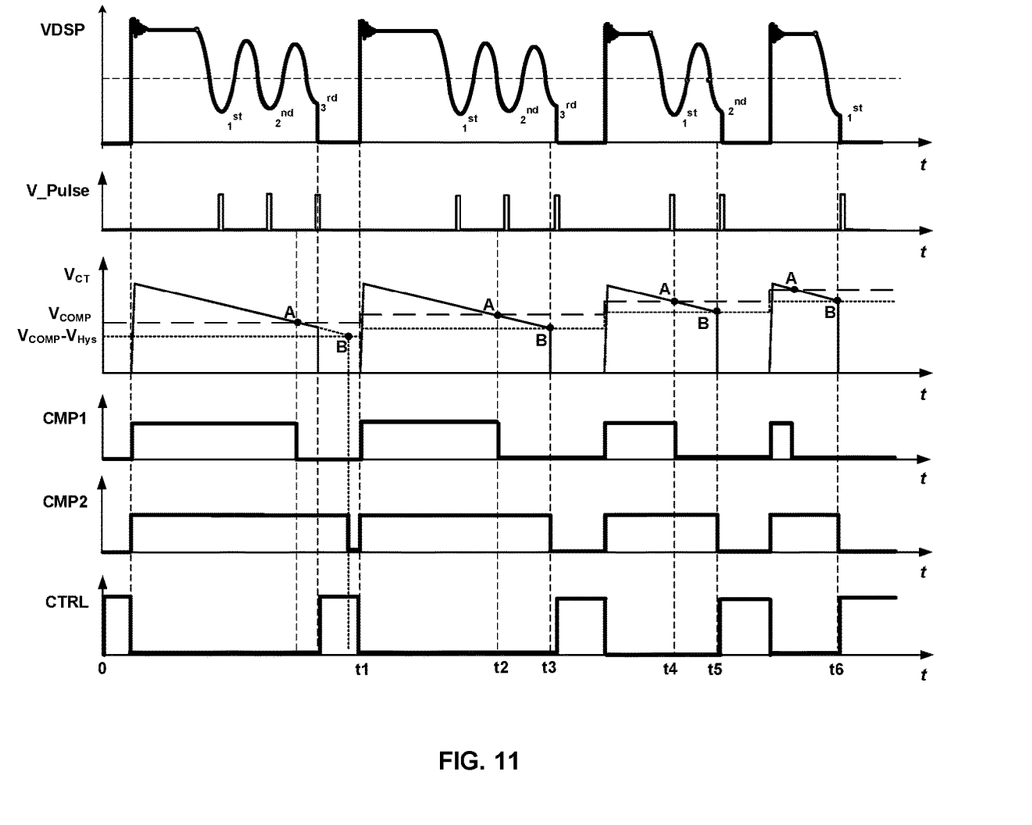
FIG. 11 illustrates working waveforms of the switching converter 200A in accordance with another embodiment of the present invention.

FIG. 11 illustrates working waveforms of the switching converter 200A in accordance with another embodiment of the present invention. As shown in FIG. 11, at time t1, the current locked valley number is 3. At time t2, the count value V_CNT at the point A is 1, and the target locked valley number will not increase. At time t3, the count value at point B is 2, the second designated valley number is 2, the difference between the second designated valley number and the current locked valley number is less than the predetermined value (e.g., 2). Accordingly, the target locked valley number keeps unchanged. At time t4, the count value V_CNT at the point A is 1, and the target locked valley number will still not increase. At time t5, the count value V_CNT at point B is 1, the difference between the second designated valley number and the current locked valley number is equal to the predetermined value m (e.g., 2). Accordingly, the target locked valley number decreases to 2.

The embodiments discussed above are all related to switching converters that have quasi-resonant control. The embodiments of the present invention also can be applied to a switching converter that can work in multi-mode including both CCM, QR mode and/or DCM.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A controller used in a switching converter having a first switch and an energy storage component coupled to the first switch, the controller comprising:
   a hysteresis feedback circuit configured to generate a hysteresis feedback signal based on an output feedback signal indicative of an output signal of the switching converter;
   a first comparison circuit configured to compare the hysteresis feedback signal with a ramp signal and generate a first comparison signal;
   a second comparison circuit configured to compare the output feedback signal with the ramp signal and generate a second comparison signal;
   a valley detection circuit configured to provide a valley pulse signal in response to one or more valleys of a voltage drop across the first switch during an OFF state of the first switch; and
   a turn-on control circuit configured to generate a target locked valley number based on the valley pulse signal, the first comparison signal, the second comparison signal and a current locked valley number, and further configured to generate a turning on control signal corresponding to the target locked valley number for turning ON the first switch.

2. The controller of claim 1, further comprising:
   a third comparison circuit configured to compare a current sensing signal indicative of a current flowing through the first switch and a first threshold voltage and generate a turning OFF control signal for turning off the first switch.

3. The controller of claim 1, wherein the first hysteresis voltage varies with an input line voltage of the switching converter.

4. The controller of claim 1, wherein the turn-on control circuit is configured to determine whether to increase the target locked valley number by comparing a first designated valley number when the ramp signal reaches the hysteresis feedback signal with the current locked valley number.

5. The controller of claim 4, wherein the turn-on control circuit is further configured to determine whether to decrease the target locked valley number by comparing a difference between a second designated valley number and the current locked valley number with a predetermined value, and wherein the second designated valley number is the valley number when the ramp signal reaches the output feedback signal.

6. The controller of claim 1, wherein:
   the hysteresis feedback circuit is configured to provide a first hysteresis voltage based on the output feedback signal and provide the hysteresis feedback signal by adding the first hysteresis voltage onto the output feedback signal; and
   wherein the ramp signal ramps down during the OFF state of the first switch.

7. The controller of claim 1, wherein:
   the hysteresis feedback circuit is configured to provide a second hysteresis voltage based on the output feedback signal and provide the hysteresis feedback signal by subtracting the second hysteresis voltage from the output feedback signal; and wherein the ramp signal ramps up during the OFF state of the first switch.

8. The controller of claim 6, wherein the first hysteresis voltage and the output feedback signal have the following relationships:
the first hysteresis voltage has a maximum value when the output feedback signal is greater than a first feedback voltage;
the first hysteresis voltage decreases as the output feedback signal decreases when the output feedback signal is between the first feedback voltage and a second feedback voltage; and
the first hysteresis voltage has a minimum value when the output feedback signal is less than the second feedback voltage.

9. A switching converter, comprising:
an energy storage component;
a first switch coupled to the energy storage component;
a hysteresis feedback circuit configured to generate a hysteresis feedback signal based on an output feedback signal indicative of an output signal of the switching converter;
a first comparison circuit configured to compare the hysteresis feedback signal with a ramp signal and generate a first comparison signal;
a second comparison circuit configured to compare the output feedback signal with the ramp signal and generate a second comparison signal;
a valley detection circuit configured to provide a valley pulse signal in response to one or more valleys of a voltage drop across the first switch during an OFF state of the first switch; and
a turn-on control circuit configured to generate a target locked valley number based on the valley pulse signal, the first comparison signal, the second comparison signal and a current locked valley number, and further configured to generate a turning on control signal corresponding to the target locked valley number for turning ON the first switch.

10. The switching converter of claim 9, wherein the turn-on control circuit is configured to determine whether to increase the target locked valley number by comparing a first designated valley number when the ramp signal increases to reach the hysteresis feedback signal with the current locked valley number.

11. The switching converter of claim 9, wherein the turn-on control circuit is further configured to determine whether to decrease the target locked valley number by comparing a difference between a second designated valley number and the current locked valley number with a predetermined value, and wherein the second designated valley number is the valley number when the ramp signal increases to reach the output feedback signal.

12. The switching converter of claim 9, further comprising:
a third comparison circuit configured to compare a current sensing signal indicative of a current flowing through the first switch and a first threshold voltage and generate a turning OFF control signal for turning off the first switch.

13. The switching converter of claim 9, wherein:
the hysteresis feedback circuit is configured to provide a first hysteresis voltage based on the output feedback signal and provide the hysteresis feedback signal by adding the first hysteresis voltage onto the output feedback signal; and wherein the ramp signal ramps down during the OFF state of the first switch.

14. The switching converter of claim 13, wherein the first hysteresis voltage and the output feedback signal have the following relationships:
the first hysteresis voltage has a maximum value when the output feedback signal is greater than a first feedback voltage;
the first hysteresis voltage decreases as the output feedback signal decreases when the output feedback signal is between the first feedback voltage and a second feedback voltage; and
the first hysteresis voltage has a minimum value when the output feedback signal is less than the second feedback voltage.

15. The switching converter of claim 9, wherein:
the hysteresis feedback circuit is configured to provide a second hysteresis voltage based on the output feedback signal and provide the hysteresis feedback signal by subtracting the second hysteresis voltage from the output feedback signal; and
wherein the ramp signal ramps up during the OFF state of the first switch.

16. A control method of a switching converter having an energy storage component and a first switch coupled to the energy storage component, the control method comprising:
generating an output feedback signal by sensing an output signal of the switching converter;
generating a hysteresis feedback signal based on the output feedback signal;
comparing the hysteresis feedback signal with a ramp signal and generating a first comparison signal;
comparing the output feedback signal with the ramp signal and generating a second comparison signal;
detecting one or more valleys of a voltage drop across the first switch during an OFF state of the first switch and generating a valley pulse signal;
generating a target locked valley number based on the valley pulse signal, the first comparison signal, the second comparison signal and a current locked valley number; and
generating a turning on control signal corresponding to the target locked valley number for turning on the first switch.

17. The control method of claim 16, wherein generating the hysteresis feedback signal comprising:
providing a second hysteresis voltage based on the output feedback signal; and
providing the hysteresis feedback signal by subtracting the second hysteresis voltage from the output feedback signal.

18. The control method of claim 16, wherein generating the target locked valley number comprising:
determining whether to increase the target locked valley number by comparing a first designated valley number when the ramp signal reaches the hysteresis feedback signal with the current locked valley number; and
determining whether to decrease the target locked valley number by comparing a difference between a second designated valley number and the current locked valley number with a predetermined value, and wherein the second designated valley number is the valley number when the ramp signal reaches the output feedback signal.

19. The control method of claim 18, wherein generating the hysteresis feedback signal comprising:
   providing a first hysteresis voltage based on the output feedback signal; and
   providing the hysteresis feedback signal by adding the first hysteresis voltage onto the output feedback signal.

20. The control method of claim 19, wherein:
   the first hysteresis voltage has a maximum value when the output feedback signal is greater than a first feedback voltage;
   the first hysteresis voltage decreases as the output feedback signal decreases when the output feedback signal is between the first feedback voltage and a second feedback voltage; and
   the first hysteresis voltage has a minimum value when the output feedback signal is less than the second feedback voltage.

\* \* \* \* \*